United States Patent
Azuma et al.

(10) Patent No.: US 8,895,489 B2
(45) Date of Patent: Nov. 25, 2014

(54) GREASE COMPOSITION FOR HUB UNIT BEARING

(75) Inventors: Takashi Azuma, Fujisawa (JP); Yoshihisa Imamoto, Fujisawa (JP); Motohiro Ito, Kuwana (JP); Yasushi Shibata, Iwata (JP)

(73) Assignees: Kyodo Yushi Co., Ltd., Fujisawa (JP); NTN Corporation, Osaka (JP)

( * ) Notice: Subject to any disclaimer, the term of this patent is extended or adjusted under 35 U.S.C. 154(b) by 0 days.

(21) Appl. No.: 13/820,604

(22) PCT Filed: Sep. 2, 2011

(86) PCT No.: PCT/JP2011/069998
§ 371 (c)(1),
(2), (4) Date: Mar. 4, 2013

(87) PCT Pub. No.: WO2012/029940
PCT Pub. Date: Mar. 8, 2012

(65) Prior Publication Data
US 2013/0157915 A1 Jun. 20, 2013

(30) Foreign Application Priority Data
Sep. 2, 2010 (JP) ................................ 2010-196762

(51) Int. Cl.
*F16C 33/20* (2006.01)
*C10M 141/10* (2006.01)
(Continued)

(52) U.S. Cl.
CPC ..... *C10M 141/10* (2013.01); *C10M 2203/1006* (2013.01); *C10M 2207/10* (2013.01); *C10M 2223/049* (2013.01); *F16C 19/186* (2013.01); *F16C 33/6633* (2013.01); *C10N 2230/02* (2013.01); *C10N 2220/022* (2013.01); *C10M 169/06* (2013.01); *C10M 2219/044* (2013.01); *C10N 2240/02* (2013.01); *C10M 2223/04* (2013.01); *C10M 2215/1026* (2013.01); *C10N 2210/02* (2013.01); *F16C 2326/02* (2013.01); *C10N 2250/10* (2013.01); *C10N 2230/12* (2013.01); *C10N 2230/06* (2013.01); *C10M 2205/12* (2013.01)
USPC ........... 508/408; 508/100; 508/391; 508/442; 508/552

(58) Field of Classification Search
USPC ........................................ 508/100, 408, 442
See application file for complete search history.

(56) References Cited

U.S. PATENT DOCUMENTS 5,922,654 A * 7/1999 Yamazaki et al. ............ 508/364
2005/0209115 A1 9/2005 Kinoshita et al.
(Continued)

FOREIGN PATENT DOCUMENTS

JP 2003-321693 11/2003
JP 2006-077056 3/2006
(Continued)

OTHER PUBLICATIONS

International Search Report for PCT/JP2011/069998, mailed Dec. 6, 2011.
(Continued)

*Primary Examiner* — Vishal Vasisth
(74) *Attorney, Agent, or Firm* — Nixon & Vanderhye P.C.

(57) ABSTRACT

The invention provides a grease composition for hub unit bearing, containing (a) an aromatic diurea thickener, (b) a base oil, (c) a metal salt of oxidized wax, (d) diphenyl hydrogen phosphate, and (e) at least one rust preventive selected from the group consisting of sulfonate rust preventives and carboxylic acid rust preventives. The grease composition of the invention shows excellent anti-fretting properties at low temperature, and at the same time, exhibit excellent rust preventing properties.

5 Claims, 1 Drawing Sheet

(51) Int. Cl.
*C10M 115/08* (2006.01)
*C10M 159/24* (2006.01)
*C10M 169/06* (2006.01)
*F16C 19/18* (2006.01)
*F16C 33/66* (2006.01)

(56) References Cited

U.S. PATENT DOCUMENTS

| | | |
|---|---|---|
| 2007/0155634 A1 | 7/2007 | Kubota et al. |
| 2008/0176776 A1* | 7/2008 | E. et al. ............ 508/376 |
| 2009/0003742 A1 | 1/2009 | Nakatani et al. |
| 2009/0116771 A1* | 5/2009 | Kamimura et al. ......... 384/100 |
| 2011/0086785 A1 | 4/2011 | Kubota et al. |

FOREIGN PATENT DOCUMENTS

| | | |
|---|---|---|
| JP | 2008-013624 | 1/2008 |
| WO | WO 2006/078035 | 7/2006 |

OTHER PUBLICATIONS

Written Opinion of the International Searching Authority for PCT/JP2011/069998, mailed Dec. 6, 2011.

Yamamoto, Y. et al., "Tribology", Rikogakusha Publishing Co., Ltd., (Nov. 25, 1999), pp. 201-203, with English-language translation.

* cited by examiner

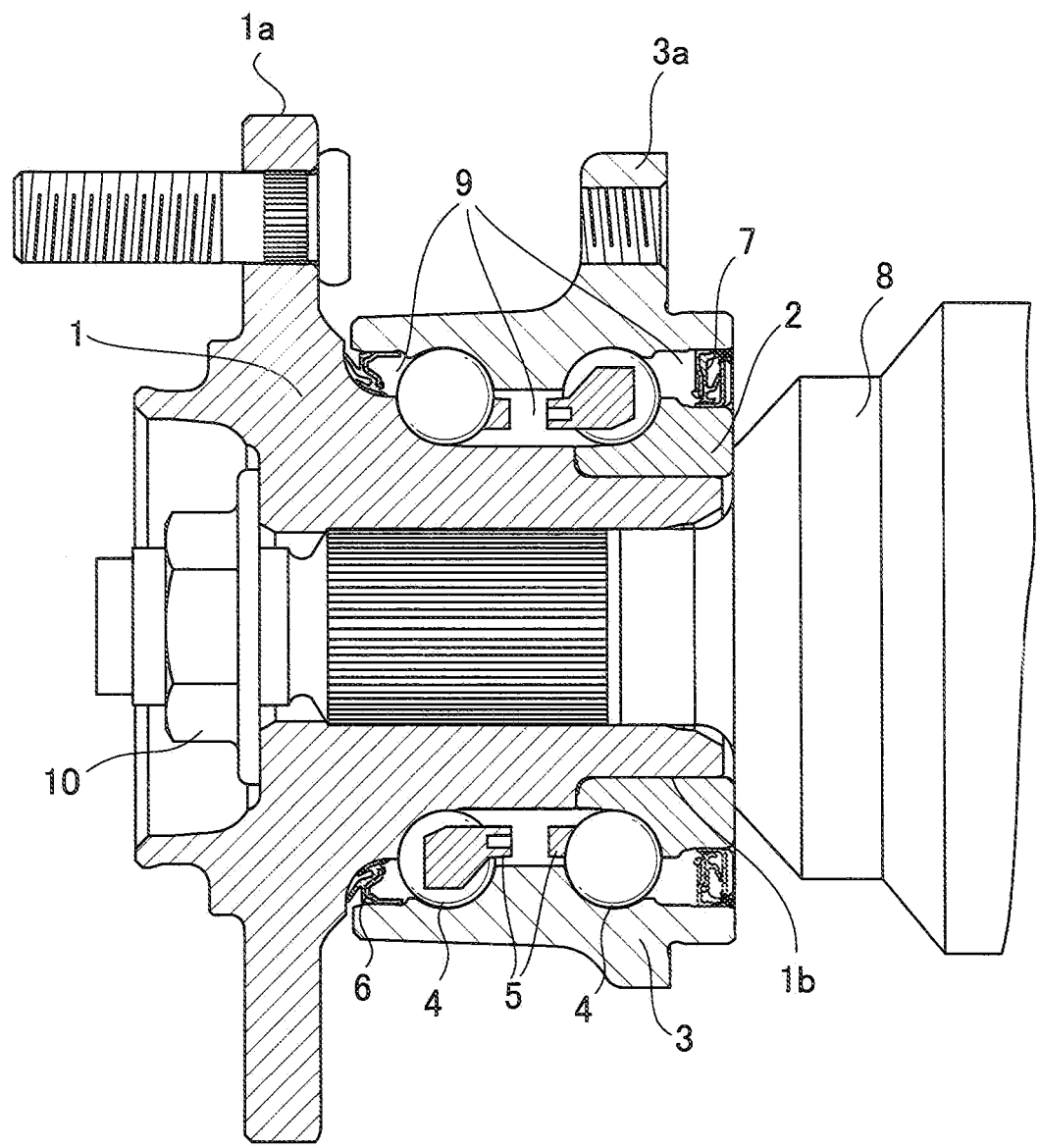

GREASE COMPOSITION FOR HUB UNIT BEARING

This application is the U.S. national phase of International Application No. PCT/JP2011/069998, filed 2 Sep. 2011, which designated the U.S. and claims priority to Japan Application No. 2010-196762, filed 2 Sep. 2010, the entire contents of each of which are hereby incorporated by reference.

TECHNICAL FIELD

The present invention relates to a grease composition for hub unit bearings of motorcars. More particularly, the present invention relates to a grease composition excellent in the anti-fretting properties at low temperatures and the rust preventing properties.

BACKGROUND ART

There are bearings used for automotive wheels, i.e., for driving wheels and follower wheels, which will be hereinafter referred to as automotive hub unit bearings, where a hub ring for fixing an automotive wheel is rotatably supported via a double-row rolling bearing. For the structural reason, the inner ring is generally rotated in the automotive hub unit bearing for driving wheel; and either the inner ring or the outer ring is rotated in that for follower wheel. The automotive hub unit bearings are roughly divided into four groups: the first generation structure where a bearing for automotive wheel such as a double row angular rolling bearing or the like is fitted into a space between a knuckle for constituting a suspension and a hub ring; the second generation structure where a flange for fixing a car body or a flange for attaching a wheel is directly formed on the periphery of an external member; the third generation structure where one of the internal raceways is directly formed on the circumference of the hub ring; and the fourth generation structure where the respective internal raceways are directly formed on the circumference of the hub ring and the circumference of the external joint member of a constant velocity universal joint coupling.

Motorcars are often transported by train or truck. During the transportation, fretting wear may occur on the rolling raceways of bearing due to vibration induced by rail joints and rough roads. The fretting is a surface damage induced under a minute amplitude of vibration, and generates oxidized debris in the air, which is said to often cause abrasive action to lead to considerable corrosion (Yuji Yamamoto et al., "Tribology" Rikogakusha Publishing Co., Ltd. (25 Nov. 1999): 201-203).

Some measures are proposed to prevent the fretting wear, for example, (1) decreasing the relative amplitude of sliding motion, (2) separating the contact surfaces not to come in a direct contact therewith, and (3) coating the contact surfaces with a phosphate coating or the like or supplying a lubricating oil or grease to prevent the metal surfaces from adhering to each other by (Yuji Yamamoto et al., "Tribology" Rikogakusha Publishing Co., Ltd. (25 Nov. 1999): 201-203).

Many greases with excellent anti-fretting properties have been developed and examined especially in the field of grease for automotive hub unit bearings.

For example, it is reported that the grease employing an aromatic diurea as a thickener to increase the grease consistency exhibits significantly improved anti-fretting properties when compared with the grease containing a conventional lithium soap as the thickener (Yuji Yamamoto et al., "Tribology" Rikogakusha Publishing Co., Ltd. (25 Nov. 1999): 201-203).

JP 2006-77056 A discloses that a grease comprising a particular urea compound and organic molybdenum compound can significantly extend the flaking life and the lubricating life and reduce the fretting.

JP 2003-321693 A reports that improved anti-fretting properties can be obtained by adding to a lubricating base oil a particular diurea compound and at least one selected from the group consisting of oxidized paraffins and phosphorus-containing compounds at particular concentrations.

As mentioned above, methods for improving the grease flowability by choosing the kind of thickener or increasing the consistency, and methods of adding the particular additives have been practically employed to prevent the problem of fretting.

However, any of the above-mentioned methods are measures taken against the fretting which may occur at the normal temperature, and the effects of those methods are still insufficient to prevent the fretting from occurring at low temperatures.

Under the conditions of low temperatures, the grease flowability decreases as the viscosity of the base oil contained in the grease increases, so that the possibility of preventing the metal surfaces from adhering to each other by the supply of grease thereto as mentioned in the above method (3) will be considerably lowered. Therefore, the effects of the additives can hardly be expected. In light of the above, it is proposed to use a synthetic oil characterized by a relatively moderate increase in viscosity even at low temperatures. However, such a synthetic oil has not yet been widely used from the economical viewpoint.

The automotive hub unit bearing is disposed at a portion readily exposed to muddy water and the like. Therefore, a sealing apparatus such as a seal is used to tightly seal the space between the external member and the internal member.

However, it is difficult to keep a perfect sealing condition over an extended period of time. Deterioration of the sealing apparatus may let a slight amount of muddy water permeate into the inside. The muddy water thus induces rust on the bearing, which will contribute to a decrease of the bearing life.

Accordingly, the grease for hub unit bearing is required to have both anti-fretting properties and water resistance, in particular, excellent rust preventing properties.

SUMMARY OF INVENTION

Technical Problem

An object of the invention is to provide a grease composition excellent in anti-fretting properties at low temperatures and rust preventing properties.

Solution to Problem

The invention provides the following grease composition:

(1) A grease composition for hub unit bearing, characterized by comprising the following components (a) to (e):
(a) an aromatic diurea thickener,
(b) a base oil,
(c) a metal salt of oxidized wax,
(d) diphenyl hydrogen phosphate, and
(e) at least one rust preventive selected from the group consisting of sulfonate rust preventives and carboxylic acid rust preventives.

(2) The grease composition for hub unit bearing described in the above-mentioned item (1), wherein the rust preventive (e) is calcium sulfonate.

(3) The grease composition for hub unit bearing described in the above-mentioned item (1), wherein the rust preventive (e) is calcium dinonylnaphthalenesulfonate.

(4) The grease composition for hub unit bearing described in any one of the above-mentioned items (1) to (3), wherein the rust preventive (e) is contained in an amount of 0.5 to 5 mass % of the total mass of the grease composition.

(5) The grease composition for hub unit bearing described in any one of the above-mentioned items (1) to (4), wherein the metal salt of oxidized wax (c) is a calcium salt of oxidized petroleum wax.

(6) The grease composition for hub unit bearing described in any one of the above-mentioned items (1) to (5), wherein the metal salt of oxidized wax (c) is contained in an amount of 0.5 to 10 mass % of the total mass of the grease composition.

(7) The grease composition for hub unit bearing described in any one of the above-mentioned items (1) to (6), wherein the diphenyl hydrogen phosphate (d) is contained in an amount of 0.1 to 5 mass % of the total mass of the grease composition.

(8) A hub unit bearing in which the grease composition described in any one of the above-mentioned items (1) to (7) is enclosed.

Advantageous Effects of Invention

The grease composition of the invention can reduce the fretting wear at low temperatures, and also show excellent rust preventing properties.

BRIEF DESCRIPTION OF THE DRAWING

FIG. 1 is a diagram showing an automotive hub unit of the third generation for driving wheels.

DESCRIPTION OF EMBODIMENTS (a) Thickener

The thickener that can be used in the invention is represented by the following formula, which thickener is generally used as the one having excellent heat resistance:

$$R^1\text{—NHCONH—}R^2\text{—NHCONH—}R^3 \quad (1)$$

wherein $R^1$ and $R^3$ may be the same or different and are each an aromatic hydrocarbon group having 6 to 12 carbon atoms. Specifically, $R^1$ and $R^3$ may be phenyl group, tolyl group, xylyl group, cumenyl group, t-butyl phenyl group, benzyl group, mesityl group or the like. Of the above groups, tolyl group is preferable.

$R^2$ represents an aromatic hydrocarbon group having 6 to 15 carbon atoms. The representative examples may be represented by the following structural formulas:

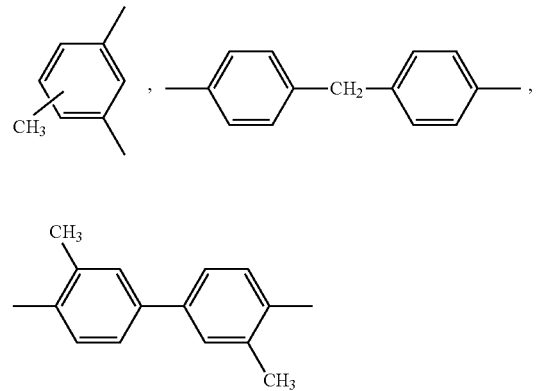

Specifically, the compounds of the following formulas (1-1) and (1-2) can be listed as the urea compounds that can be used. In particular, the urea thickener of formula (1-1) is preferable.

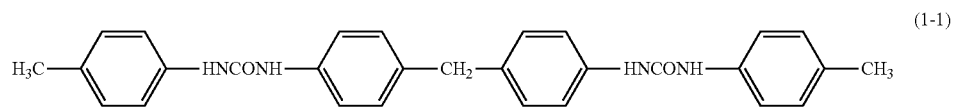

(1-1)

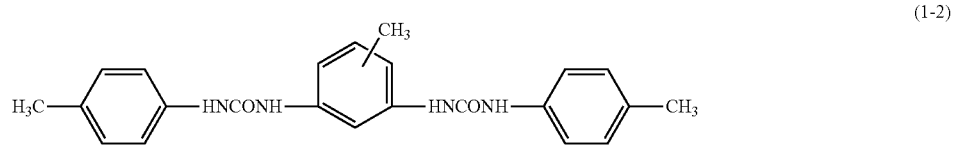

(1-2)

In the composition of the invention the content of the urea compound is not particularly limited, but preferably within the range of 2 to 35 mass %, more preferably 10 to 25 mass % with respect to the base oil.

The urea thickener used in the invention can be obtained by reacting a monoamine with a diisocyanate at 10 to 200° C., for example. The method for the above-mentioned reaction is not particularly limited, and any conventional methods can be used for production. In this case, certain volatile solvents may be used, but when a base oil is used as the solvent, the base oil may be incorporated into the resultant composition of the invention.

Specific examples of the diisocyanate that can be used include aromatic diisocyanate compounds such as 2,4-tolylene diisocyanate, 2,6-tolylene diisocyanate, diphenylmethane-4,4'-diisocyanate, naphthylene-1,5-diisocyanate and the like, and the mixtures thereof. Examples of the monoamine include aromatic amine compounds such as aniline, benzylamine, toluidine, chloroaniline, and the like.

The above-mentioned urea thickener has a film-forming ability, which can contribute to improvement of the life (flaking) and the anti-fretting properties. Unlike the metallic soap thickener, the urea thickener does not act to promote oxidation of the base oil, so that the urea thickener can extend the oxidation life (i.e., lubricating life).

(b) Base Oil

Preferably, the base oil used in the invention may have a kinetic viscosity at 40° C. of 50 to 200 mm²/s, more preferably 50 to 80 mm²/s. When the kinetic viscosity at 40° C. is less than 50 mm²/s, the resultant grease film tends to be thinner and a sufficient thickness of the grease film will not be ensured, which may cause surface damage. When the kinetic viscosity at 40° C. exceeds 200 mm²/s, the viscosity resistance is apt to increase, which may lead to heat generation and increase of the torque.

Both mineral oils and synthetic oils can be used for the base oil, but mineral oils are preferable from the economical viewpoint. The content of the mineral oil in the base oil may preferably be 70 mass % or more, and more preferably 80 to 100 mass %.

When the synthetic oil is used, any conventional synthetic oils, such as poly α-olefin oils made from 1-decene as a starting material, co-oligomer oils of α-olefin and ethylene, phenyl ether-based synthetic oils, ester-based synthetic oils, polyglycol-based synthetic oils, silicone oils and the like can be used. As the synthetic oil, hydrocarbon oils consisting of carbon atoms and hydrogen atoms are particularly preferable. When the synthetic hydrocarbon oil is contained as the synthetic oil in the mixed base oil system, grease leakage from the bearing can be advantageously reduced, with no adverse effect on the seal.

(c) Metal Salt of Oxidized Wax

As the metal salts of oxidized paraffin that can be used in the invention, alkali metal salts, alkaline earth metal salts, amine salts and the like are included. Particularly, alkaline earth metal salts and amine salts are preferable, and calcium salts, barium salts and amine salts are more preferable. The oxidized wax obtained by subjecting petroleum waxes such as paraffin wax, microcrystalline wax, slack wax and the like or synthetic waxes such as polyolefin wax and the like to oxidation can be used. Most preferable is calcium salt of oxidized petroleum wax.

In consideration of the anti-fretting properties, the content of the metal salt of oxidized wax may preferably be 0.5 to 10 mass %, more preferably 0.5 to 6 mass %, based on the total mass of the grease composition of the invention.

(d) Diphenyl Hydrogen Phosphate

Diphenyl hydrogen phosphate used in the invention is represented by the general formula shown below.

In consideration of the anti-fretting properties, the content of diphenyl hydrogen phosphate may preferably be 0.1 to 5 mass %, more preferably 0.1 to 2 mass %, based on the total mass of the grease composition of the invention.

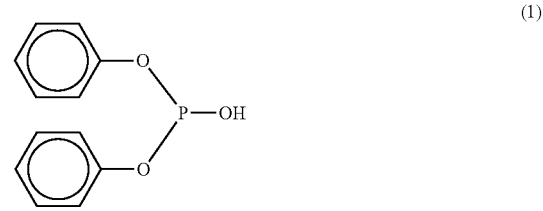

(1)

(e) Rust Preventive

The grease composition of the invention comprises at least one rust preventive selected from the group consisting of sulfonate rust preventives and carboxylic acid rust preventives.

For example, the sulfonates include alkaline earth metal salts such as calcium, magnesium, barium and the like, alkali metal salts such as sodium, potassium, lithium and the like, zinc salts, lead salts, ammonium salts, and amine salts such as ethylenediamine salts and the like of benzenesulfonic acid or naphthalenesulfonic acid which may be mono- or di-substituted with an alkyl group having 1 to 12 carbon atoms. Preferably, calcium salts, barium salts, zinc salts and ammonium salts may be used. Calcium salts, zinc salts and ammonium salts of naphthalenesulfonic acid which may be mono- or di-substituted with an alkyl group having 1 to 12 carbon atoms are more preferable, and zinc salts of naphthalenesulfonic acid which may be mono- or di-substituted with an alkyl group having 1 to 12 carbon atoms may be most preferable.

With respect to the carboxylic acid rust preventives, there are monocarboxylic acids including straight-chain fatty acids such as lauric acid, stearic acid and the like, and saturated carboxylic acids having a naphthene nucleus; and dicarboxylic acids including succinic acid and succinic acid derivatives such as alkylsuccinic acid, half ester of alkylsuccinic acid, alkenylsuccinic acid, half ester of alkenylsuccinic acid, succinimide and the like. Further, oxidized waxes such as oxides of wax and petrolatum can also be used. In particular, alkenylsuccinic acid and half ester thereof are preferred.

As the rust preventive (e) used in the invention, sulfonates are preferable, and calcium sulfonates are more preferable. Especially, calcium salt of dinonyl naphthalenesulfonic acid is favorable.

In consideration of the rust preventing properties, the content of the rust preventive may preferably be 0.5 to 5 mass %, more preferably 0.5 to 3 mass %, based on the total mass of the grease composition of the invention.

If desired, the grease composition of the invention may further comprise other additives such as an antioxidant, extreme pressure agent, oiliness improver, metal deactivator and the like to further enhance various properties, which additives may be used alone or in combination. The contents of those additives are not particularly limited so long as the effects of the invention are not impaired, but usually may be within the range of 0.1 to 20 mass % based on the total mass of the grease composition. When the contents of other additives are less than 0.1 mass %, the effects will be insufficient even after the addition. When the contents of other additives exceed 20 mass %, the resultant effects will be saturated and the lubricating properties may unfavorably be lowered because the content of base oil is relatively decreased.

The method for preparing the composition of the invention is not particularly limited, but various methods are usable. To be more specific, the components are added to a base oil simultaneously or consecutively, and the resultant mixture is kneaded using a roll mill or the like to prepare a composition. Alternatively, an additive composition may be prepared in advance so that the concentration may be 5 to 10 times that in the final composition according to the invention, and then the additive composition is mixed with a base oil, thereby obtaining a composition of the invention.

The embodiment of a hub unit bearing according to the invention where a grease composition of the invention is applied to an automotive hub unit will now be explained with reference to the drawing.

As an example of the hub unit, an automotive hub unit for driving wheel according to the third generation is shown in FIG. 1.

In FIG. 1, an inner ring 1 also serves as a hub ring. The smaller-diameter sided end of the inner ring 2 abuts against the shoulder of the inner ring 1, thereby forming a double row angular contact ball bearing of a back-to-hack type. The inner ring 1 is integrally formed on the external circumference thereof with a wheel attachment flange 1a for fixing a wheel (not shown), a raceway corresponding to the outboard race of the outer ring 3, and a stepped small-diameter cylindrical portion lb for fitting the inner ring 2 to be disposed inboard. The inner ring 2 is press-fit by the predetermined interference of the stepped small-diameter portion 1b of the inner ring 1, and fixed to the inner ring 1 in the axial direction thereof. The internal circumference of the inner ring 1 is provided with serrations (or splines) for transferring torque. Hub bolts are fixed at equal intervals around the circumference of the wheel attachment flange 1a. The inner ring 1 is fixed to the wheel when the wheel is fastened to the wheel attachment flange 1a.

The outer ring 3 is integrally formed on the external circumference thereof with an attachment flange 3a. The outer ring 3 is fixed to a car body when a knuckle for constituting a suspension (not shown) is fastened to the attachment flange 3a.

In each of the double rows, rolling elements 4 incorporated between the raceway of the outer ring 3 and the raceway of the inner rings 1, 2 are retained by cage 5, 5.

A circular opening space formed between the inner rings 1, 2 and the outer ring 3 is tightly sealed with seals 6, 7 fixed to the outer ring 3. The seals 6, 7 serve to prevent lubricating grease enclosed in the bearing from leaking, and also prevent muddy water, rain water, dust and the like from invading from the outside into the bearing. A constant velocity universal joint coupling 8 is connected to the inner ring 1. An external joint member of the constant velocity universal joint coupling 8 engages the serrations formed on the internal circumference of the inner ring 1. By fastening a fixed nut 10 screwed on a screw shaft of the external joint member, the constant velocity universal joint coupling 8 is joined to the inner ring 1 so that the torque can be transferred. Also, the constant velocity universal joint coupling 8 can be connected to the inner ring 1 detachably. A given amount of the grease composition according to the invention is charged into a space 9 tightly sealed with the seals 6, 7.

EXAMPLES

Grease compositions of Examples 1 to 4 and Comparative Examples 1 to 5 were prepared by adding a thickener (a) and other components (c), (d) and (e) as shown in Tables 1 and 2 to a base oil (b) (having a kinetic viscosity at 40° C. of 74.7 mm$^2$/s) as shown in Tables 1 and 2, and kneading the resultant mixture using a three roll mill. The numerical values in Tables 1 and 2 represent the contents (mass %) of the individual components in the composition. The balance is a base oil.

In Examples 1 to 4 and Comparative Examples 1 to 3, an aromatic urea compound represented by the above-mentioned formula (1-1) was used as the thickener (a).

As the component (c), a calcium salt of oxidized petroleum wax predominantly comprising paraffin was used.

As the component (d), diphenyl hydrogen phosphate was used.

As the component (e), calcium dinonylnaphthalenesulfonate was used.

An antioxidant was added as an optional component to each composition in an amount of 2 mass %.

Every grease composition was adjusted to have a consistency of 300 when determined in accordance with JIS K2220.
[Evaluation Methods and Judgment]
<Fretting Test>
Fafnir Friction Oxidation Test (in Accordance with ASTM D 4170)

A test grease was applied to two test thrust bearings as shown below, and then the bearings were subjected to a prescribed oscillation motion to determine the abrasion wear (weight loss by the fretting wear).
Bearing: ANDREWS W 5/8
Load: 2450 N
Angle of oscillation: 0.21 rad
Oscillation cycle: 25 Hz
Duration: 22 hours
Temperature: −40° C.
Filling amount of grease: 1.0 g per bearing
Abrasion wear: weight loss of the race per bearing (by dividing the total weight loss of the test bearing races by 2)

Judgment: The marks oo and o are regarded as acceptable.
oo: abrasion wear of less than 5.0 mg
o: abrasion wear of 5.0 mg or more and less than 10.0 mg
x: abrasion wear of 10.0 mg or more
<Bearing Rust Preventing Test>

The test was conducted in accordance with ASTM D1743-73 (NaCl at a concentration of 1%, 40° C., 48 hours)

The surface of the outer ring race was divided equally into 32 sections along the circumference. The number of rust development was determined by counting the number of sections where rust was gathered.

Judgment: The marks oo and o are regarded as acceptable.
oo: the number of rust development=less than 10 sections
o: the number of rust development=10 sections or more and less than 20 sections
x: the number of rust development=20 sections or more

TABLE 1

|  |  | Example 1 | Example 2 | Example 3 | Example 4 |
|---|---|---|---|---|---|
| (a) Thickener | Type | Aromatic diurea | Aromatic diurea | Aromatic diurea | Aromatic diurea |
|  | % | 19 | 19 | 19 | 19 |
| (b) Base oil |  | Mineral oil | Mineral oil | Mineral oil | Mineral oil |
| (c) Component |  | 4.0 | 4.0 | 1.0 | 1.0 |
| (d) Component |  | 1.0 | 1.0 | 0.1 | 0.1 |
| (e) Component |  | 2.0 | 0.5 | 2.0 | 0.5 |
| Fretting test |  | oo | oo | o | o |
| Bearing rust preventing test |  | oo | o | oo | o |

TABLE 2

|  |  | Comp. Example 1 | Comp. Example 2 | Comp. Example 3 | Comp. Example 4 | Comp. Example 5 |
|---|---|---|---|---|---|---|
| (a) Thickener | Type | Aromatic diurea | Aromatic diurea | Aromatic diurea | Lithium soap | Alicyclic diurea |
|  | % | 19 | 19 | 19 | 8 | 15 |
| (b) Base oil |  | Mineral oil | Mineral oil | Mineral oil | Mineral oil | Mineral oil |
| (c) Component |  | 4.0 | — | 4.0 | 4.0 | 4.0 |
| (d) Component |  | 1.0 | 1.0 | — | 1.0 | 1.0 |
| (e) Component |  | — | 2.0 | 2.0 | 2.0 | 2.0 |
| Fretting test |  | oo | x | x | x | x |
| Bearing rust preventing test |  | x | oo | oo | o | o |

As can be seen from Tables 1 and 2, when compared with the grease composition of Comparative Examples, the grease compositions for automotive hub unit bearing according to Examples can further reduce the fretting wear at low temperature, and at the same time, exhibit excellent rust preventing properties, so that those grease compositions are suitable for automotive hub unit bearings where water resistance and sufficient rust preventing properties are especially needed.

EXPLANATION OF REFERENCES

1, 2 Inner ring
3 Outer ring
4 Rolling element
5 Cage
6, 7 Seal
8 Constant velocity universal joint coupling
10 Fixed nut

The invention claimed is:

1. A grease composition for hub unit bearing, comprising the following components (a) to (e):
   (a) 10 to 25% by mass of an aromatic diurea thickener,
   (b) mineral oil having a kinematic viscosity at 40° C. of 50 to 80 mm$^2$/s, as a base oil,
   (c) 0.5 to 6% by mass of a calcium salt of oxidized petroleum wax as a metal salt of oxidized wax,
   (d) 0.1 to 2% by mass of diphenyl hydrogen phosphate, and
   (e) 0.5 to 3% by mass of calcium dinonylnaphthalene-sulfonate as a rust preventive,
   wherein all mass percents are based on the total mass of the composition.

2. A hub unit bearing in which the grease composition of claim 1 is packed.

3. The grease composition for hub unit bearing of claim 1, wherein the aromatic thickener (a) is represented by the following formula:

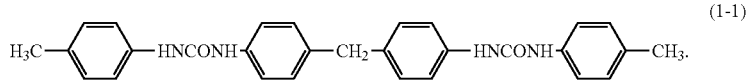

(1-1)

4. The grease composition for hub unit bearing of claim 1, wherein the composition does not substantially comprise any thickeners other than the aromatic diurea thickener.

5. The grease composition for hub unit bearing of claim 1, wherein the base oil (b) is a mineral oil.

* * * * *